(12) United States Patent
Kelsey

(10) Patent No.: US 10,397,015 B2
(45) Date of Patent: Aug. 27, 2019

(54) FIXTURE DATA OVER POWERLINE NETWORK

(71) Applicant: Not for Radio, LLC, Manheim, PA (US)

(72) Inventor: Patrick J. Kelsey, Manheim, PA (US)

(73) Assignee: Not for Radio, LLC, Manheim, PA (US)

( * ) Notice: Subject to any disclaimer, the term of this patent is extended or adjusted under 35 U.S.C. 154(b) by 0 days.

(21) Appl. No.: 15/582,280

(22) Filed: Apr. 28, 2017

(65) Prior Publication Data

US 2017/0237578 A1    Aug. 17, 2017

Related U.S. Application Data

(62) Division of application No. 14/927,229, filed on Oct. 29, 2015, now abandoned.

(51) Int. Cl.
| | |
|---|---|
| *H05B 37/02* | (2006.01) |
| *H04L 12/28* | (2006.01) |
| *H04B 3/54* | (2006.01) |
| *H04L 29/12* | (2006.01) |

(52) U.S. Cl.
CPC ........... *H04L 12/2816* (2013.01); *H04B 3/54* (2013.01); *H04L 61/2046* (2013.01); *H05B 37/0263* (2013.01); *H04B 2203/5458* (2013.01); *H04L 2012/2843* (2013.01)

(58) Field of Classification Search
CPC ............ H05B 37/0254; H05B 37/0263; H05B 37/0272; H05B 37/0281; H05B 37/029
USPC ....................................................... 315/312
See application file for complete search history.

(56) References Cited

U.S. PATENT DOCUMENTS

| | | | |
|---|---|---|---|
| 8,410,630 B2 | 4/2013 | Campbell | |
| 2007/0189026 A1* | 8/2007 | Chemel | H05B 37/029 |
| | | | 362/458 |
| 2008/0273613 A1 | 11/2008 | Kol | |
| 2011/0187275 A1 | 8/2011 | Giltaca et al. | |
| 2012/0098445 A1* | 4/2012 | Park | H05B 37/0272 |
| | | | 315/193 |
| 2012/0323394 A1* | 12/2012 | Gandhi | H05B 33/0857 |
| | | | 700/297 |
| 2013/0003876 A1 | 1/2013 | Bennett | |
| 2013/0063045 A1* | 3/2013 | Ishikita | H05B 33/086 |
| | | | 315/296 |
| 2014/0225436 A1* | 8/2014 | Lester | H04B 3/54 |
| | | | 307/17 |
| 2014/0265880 A1 | 9/2014 | Taipale et al. | |

(Continued)

FOREIGN PATENT DOCUMENTS

| | | |
|---|---|---|
| JP | 2004-165137 A | 6/2004 |
| KR | 101119828 B1 | 2/2012 |

OTHER PUBLICATIONS

International Search Report and Written Opinion dated Jan. 12, 2017 in PCT Application No. PCT/US16/58499.

(Continued)

*Primary Examiner* — Tung X Le
(74) *Attorney, Agent, or Firm* — Weaver Austin Villeneuve & Sampson LLP

(57) ABSTRACT

This disclosure provides systems, methods and apparatus for fixture data over a powerline network. In one aspect, fixture interfaces can receive control data on a powerline network and provide the control data to a fixture on a fixture network.

16 Claims, 10 Drawing Sheets

(56) References Cited

U.S. PATENT DOCUMENTS

| | | | |
|---|---|---|---|
| 2015/0237700 A1* | 8/2015 | Woytowitz | H05B 33/0863 |
| | | | 315/307 |
| 2015/0346320 A1 | 12/2015 | Hartman et al. | |
| 2016/0219679 A1 | 7/2016 | Snyder et al. | |
| 2017/0126421 A1 | 5/2017 | Kelsey | |
| 2017/0237579 A1 | 8/2017 | Kelsey | |

OTHER PUBLICATIONS

U.S. Appl. No. 14/927,229, filed Oct. 29, 2015, Kelsey.
Office Action dated Apr. 27, 2017 from U.S. Appl. No. 14/927,229.
U.S. Final Office Action dated Nov. 15, 2017 from U.S. Appl. No. 14/927,229.
U.S. Office Action dated Jan. 23, 2018 from U.S. Appl. No. 15/582,297.
International Preliminary Report on Patentability dated May 11, 2018 in PCT Application No. PCT/US16/58499.

* cited by examiner

| Plan ID | Fixture Network | | Powerline Network | | Controller Network | |
|---|---|---|---|---|---|---|
| | Logical Net | Address | Logical Net | Address | Logical Net | Address |
| T1.1 | 1 | 1 | 1 | 1 | 1 | 1 |
| T1.2 | 1 | 1 | 1 | 2 | 1 | 2 |
| T1.3 | 1 | 1 | 1 | 3 | 1 | 3 |
| T2.1 | 1 | 1 | 1 | 4 | 2 | 1 |
| T2.2 | 1 | 1 | 1 | 5 | 2 | 2 |
| T2.3 | 1 | 1 | 1 | 6 | 2 | 3 |

*FIG. 1B*

| FGUID | PUD |
|---|---|
| 1:1 | Fixture 1 – light1 |
| 1:2 | Fixture 2 – fog machine |
| 2 | Fixture 3 – light2 |

605

| FGUID | Controller Network Address |
|---|---|
| 1:1 | 2.0.0.2:1:1 |
| 1:2 | 2.0.0.2:1:11 |
| 2 | 2.0.0.2:1:21 |

610

| FGUID | Powerline Network Address |
|---|---|
| 1:1 | 3 |
| 1:2 | 5 |
| 2 | 6 |

615

| FGUID | Fixture Network Address |
|---|---|
| 1:1 | 1 |
| 1:2 | 11 |
| 2 | 1 |

620

| FGUID | Upstream Bridge IGUID | Downstream Bridge IGUID |
|---|---|---|
| 2 | 2 | 3 |

FIXTURE DATA OVER POWERLINE NETWORK

CROSS-REFERENCE TO RELATED APPLICATIONS

This application is a divisional of U.S. patent application Ser. No. 14/927,229, filed Oct. 29, 2015, entitled FIXTURE DATA OVER POWERLINE NETWORK by Kelsey, which is herein incorporated by reference in its entirety and for all purposes.

TECHNICAL FIELD

This disclosure relates to providing data to devices, such as fixtures for an event, over a powerline network.

DESCRIPTION OF THE RELATED TECHNOLOGY

Electric power systems often use alternating current (AC) electric power such as three-phase powerline systems where three separate conductors may each carry an AC current of the same frequency, but at 120 degree phase shifts. For example, a first conductor may carry an AC current at 0 degrees, a second conductor may carry an AC current at 120 degrees, and a third conductor may carry an AC current at 240 degrees. Three-phase powerline systems are often used to power heavy loads, such as large motors or electrical equipment.

Powerline communications (PLC) systems may provide data on a conductor that is simultaneously being used for an AC electric power system. The data may be provided by adding a modulated carrier signal to the conductor.

SUMMARY

The systems, methods and apparatus of this disclosure each have several innovative aspects, no single one of which is solely responsible for the desirable attributes disclosed herein.

One innovative aspect of the subject matter described in this disclosure can be implemented in a system including a first fixture interface for providing control data from a first powerline network to one or more fixtures configured to use one or more power supplies associated with the first powerline network, the first fixture interface comprising a first interface for connecting the first fixture interface to one or more conductor lines providing the one or more power supplies associated with the first powerline network; a second interface for communicating with a fixture via a first fixture network; and control logic for receiving control data and address data on the first powerline network, wherein the control data indicates settings for operating parameters of the fixture, determining the address data corresponds to the fixture on the first fixture network, and forwarding the control data to the fixture on the first fixture network corresponding to the address data.

In some implementations, the fixture comprises a light.

In some implementations, the settings for the operating parameters correspond with operations of the light, the settings for the operating parameters selected from the group including light intensity, orientation, motion, color, lens position (focus), gobo (pattern) selection, shutter state, and special effects.

In some implementations, wherein the fixture is selected from the group including a light, a dimmer rack, a color scroller, an audio/video controller, a smoke or fog generator, a contact closure, and a pyrotechnics effects instrument.

In some implementations, the control logic for determining includes translating the address data from an address corresponding to the first powerline network to an address corresponding to the first fixture network.

In some implementations, the control logic for forwarding includes translating the control data from a first protocol providing the settings for the operating parameters to a second protocol providing the settings for the operating parameters.

In some implementations, the system includes a powerline bridge interface for extracting a subset of the control data and the address data from the first powerline network and providing the subset of the control data and the address data to a second powerline network, the subset corresponding with fixtures communicating with a second interface fixture connected with the second powerline network.

In some implementations, the first powerline network is a three-phase power network, and the first interface for connecting the first fixture interface to the first powerline network comprises a connection to two or more conductor lines of the three-phase powerline network.

Another innovative aspect of the subject matter described in this disclosure can be implemented in a method providing control data from a first powerline network to one or more fixtures configured to use one or more power supplies associated with the first powerline network, the method comprising: receiving, by a fixture interface, control data and address data on the first powerline network, wherein the control data indicates settings for operating parameters of the fixture; determining, by the fixture interface, the address data corresponds to the fixture on a first fixture network; and forwarding, by the fixture interface, the control data to the fixture on the first fixture network corresponding to the address data.

In some implementations, the fixture comprises a light.

In some implementations, the settings for the operating parameters correspond with operations of the light, the settings for the operating parameters selected from the group including light intensity, orientation, motion, color, lens position (focus), gobo (pattern) selection, shutter state, and special effects.

In some implementations, the fixture comprises a fog machine.

In some implementations, the method can include translating the address data from an address corresponding to the first powerline network to an address corresponding to the first fixture network.

In some implementations, the method can include translating the control data from a first protocol providing the settings for the operating parameters to a second protocol providing the settings for the operating parameters.

In some implementations, the method can include extracting, by a powerline bridge interface, a subset of the control data and the address data from the first powerline network and providing the subset of the control data and the address data to a second powerline network, the subset corresponding with fixtures communicating with a second interface fixture connected with the second powerline network.

In some implementations, the first powerline network is a three-phase power network, and the first interface for connecting the first fixture interface to the first powerline network comprises a connection to two or more conductor lines of the three-phase powerline network.

Another innovative aspect of the subject matter described in this disclosure can be implemented in a controller interface for providing control data from a controller network to a first powerline network, and ultimately, via the first powerline network, to a first fixture to which the control data is addressed, the controller interface comprising: an interface for connecting the controller interface to the controller network; an interface for connecting the controller interface to the first powerline network, wherein the first powerline network is configured to provide the control data over one or more conductor lines of the first powerline network; control logic for receiving first control data and first address data from the controller network and addressed to the first fixture on the first powerline network, the first address data based on the controller network; and forwarding the first control data addressed to the first fixture to the first powerline network, wherein the forwarding comprises mapping the first address data from the controller network to a first address corresponding to the first powerline network.

In some implementations, the control logic for receiving is further for receiving second control data and second address data from the controller network and addressed to a second fixture on a second powerline network.

In some implementations, the control logic for forwarding is further for organizing the first control data and the second control data to be provided on the first powerline network.

In some implementations, the first control data corresponds to a first channel data range, the second control data corresponds to the first channel data range, and the control logic is further for forwarding the second control data by modifying the first channel data range corresponding to the second control data to a second channel data range, the first data channel range and the second data channel range being different.

In some implementations, the controller interface can include a powerline bridge interface for extracting the second control data on the first powerline network and providing the second control data on the second powerline network.

In some implementations, the powerline bridge interface for extracting is further for modifying the second channel data range to the first channel data range.

In some implementations, the first powerline network is a three-phase power network.

In some implementations, the controller interface is further for providing the first control data on two or more conductor lines of the first powerline network.

Another innovative aspect of the subject matter described in this disclosure can be implemented in a method for providing control data from a controller network to a first powerline network, and ultimately, via the first powerline network, to a first fixture to which the control data is addressed, the method comprising receiving, by a controller interface, first control data and first address data from the controller network and addressed to the first fixture on the first powerline network, the first address data based on the controller network; and forwarding, by the controller interface, the first control data addressed to the first fixture to the first powerline network, wherein the forwarding comprises mapping the first address data from the controller network to a first address corresponding to the first powerline network.

In some implementations, the method can include receiving second control data and second address data from the controller network and addressed to a second fixture on a second powerline network.

In some implementations, the method can include organizing the first control data and the second control data to be provided on the first powerline network.

In some implementations, the first control data corresponds to a first channel data range, the second control data corresponds to the first channel data range, and the method comprises forwarding the second control data by modifying the first channel data range corresponding to the second control data to a second channel data range, the first data channel range and the second data channel range being different.

In some implementations, the method can include extracting, by a powerline bridge interface, the second control data on the first powerline network and providing the second control data on the second powerline network.

In some implementations, the method can include modifying the second channel data range to the first channel data range.

In some implementations, the first powerline network is a three-phase power network.

In some implementations, the method can include providing the first control data on two or more conductor lines of the first powerline network.

Another innovative aspect of the subject matter described in this disclosure can be implemented in a method for commissioning addresses for fixtures by a controller interface configured to translate addresses from a controller network to one or more powerline networks, the method comprising: receiving, by the controller interface, a unique fixture identifier for each fixture on one or more fixture networks from one or more fixture interfaces communicating with the first fixture network on a first powerline network; establishing, by the controller interface, a powerline network address for each of the unique fixture identifiers; and correlating, by the controller interface, each powerline network address with a controller network address.

In some implementations, the method includes receiving, by the controller interface, one or more unique fixture identifiers for each fixture on a second powerline network from a first bridge interface, the first bridge interface communicating with the first powerline network and a second bridge interface, the second bridge interface communicating with the second powerline network; establishing, by the controller interface, a powerline network address for each of the unique fixture identifiers for each fixture on the second powerline network; and correlating, by the controller interface, each of the powerline network addresses for each of the unique fixture identifiers for each fixture on the second powerline network with a controller network address.

In some implementations, the method includes discovering, by the controller interface, the one or more fixture interfaces and the bridge interface communicating with the first powerline network, and the second bridge interface communicating with the second powerline network.

In some implementations, the method includes establishing, by the controller interface, a powerline network address for the first bridge interface and the second bridge interface; and programming, by the controller interface, the first bridge interface to forward data on the first powerline network corresponding to the fixtures on the second powerline network to the second bridge interface.

In some implementations, the method includes establishing, by the controller interface, a powerline network address for each fixture interface on the first powerline network.

Another innovative aspect of the subject matter described in this disclosure can be implemented in a controller interface configured to commission addresses for fixtures and configured to translate addresses from a controller network to one or more powerline networks, the controller interface comprising control logic for: receiving a unique fixture identifier for each fixture on one or more fixture networks from one or more fixture interfaces communicating with the first fixture network on a first powerline network; establishing a powerline network address for each of the unique fixture identifiers; and correlating each powerline network address with a controller network address.

In some implementations, the control logic is further for receiving one or more unique fixture identifiers for each fixture on a second powerline network from a first bridge interface, the first bridge interface communicating with the first powerline network and a second bridge interface, the second bridge interface communicating with the second powerline network; establishing a powerline network address for each of the unique fixture identifiers for each fixture on the second powerline network; and correlating each of the powerline network addresses for each of the unique fixture identifiers for each fixture on the second powerline network with a controller network address.

In some implementations, the control logic is further for discovering the one or more fixture interfaces and the bridge interface communicating with the first powerline network, and the second bridge interface communicating with the second powerline network.

In some implementations, the controller logic is further for establishing a powerline network address for the first bridge interface and the second bridge interface; and programming the first bridge interface to forward data on the first powerline network corresponding to the fixtures on the second powerline network to the second bridge interface.

In some implementations, the control logic is further for establishing a powerline network address on the first powerline network for each fixture interface on the second powerline network.

BRIEF DESCRIPTION OF THE DRAWINGS

FIG. 1B is an example of data used to perform address mapping.

FIG. 6B is an example of tables representing data used by components of the system of FIG. 6A to translate address between the different networks.

Like reference numbers and designations in the various drawings indicate like elements.

DETAILED DESCRIPTION

Automated lighting and special effects installations for events can vary based on composition and scale. A large outdoor concert can include an unwieldy number of cables totaling miles in length to provide power and control data for thousands of fixtures. Fixtures can include lights (stationary/ moving/etc. lamps, LEDs, strobes, lasers, etc.), dimmer racks (to dim one or more lamps), color changers/scrollers (to scroll colored films in front of lamps), audio/video controls, smoke or fog generators, contact closures (remotely operated switches), and fire, water, and pyrotechnical effects instruments.

By contrast, a smaller indoor concert might have shorter cables and fewer fixtures, but the cables and fixtures need to be installed in a more cramped environment. Different types of fixtures may also be present based on the type of event.

Additionally, different fixtures might use different control protocols. Lighting and effects protocols can include digital multiplex (DMX), Art-Net, architecture for control networks (ACN), and other protocols. For example, an event can include a subset of fixtures controlled via DMX and another subset of fixtures controlled via Art-Net.

Figure 1A:
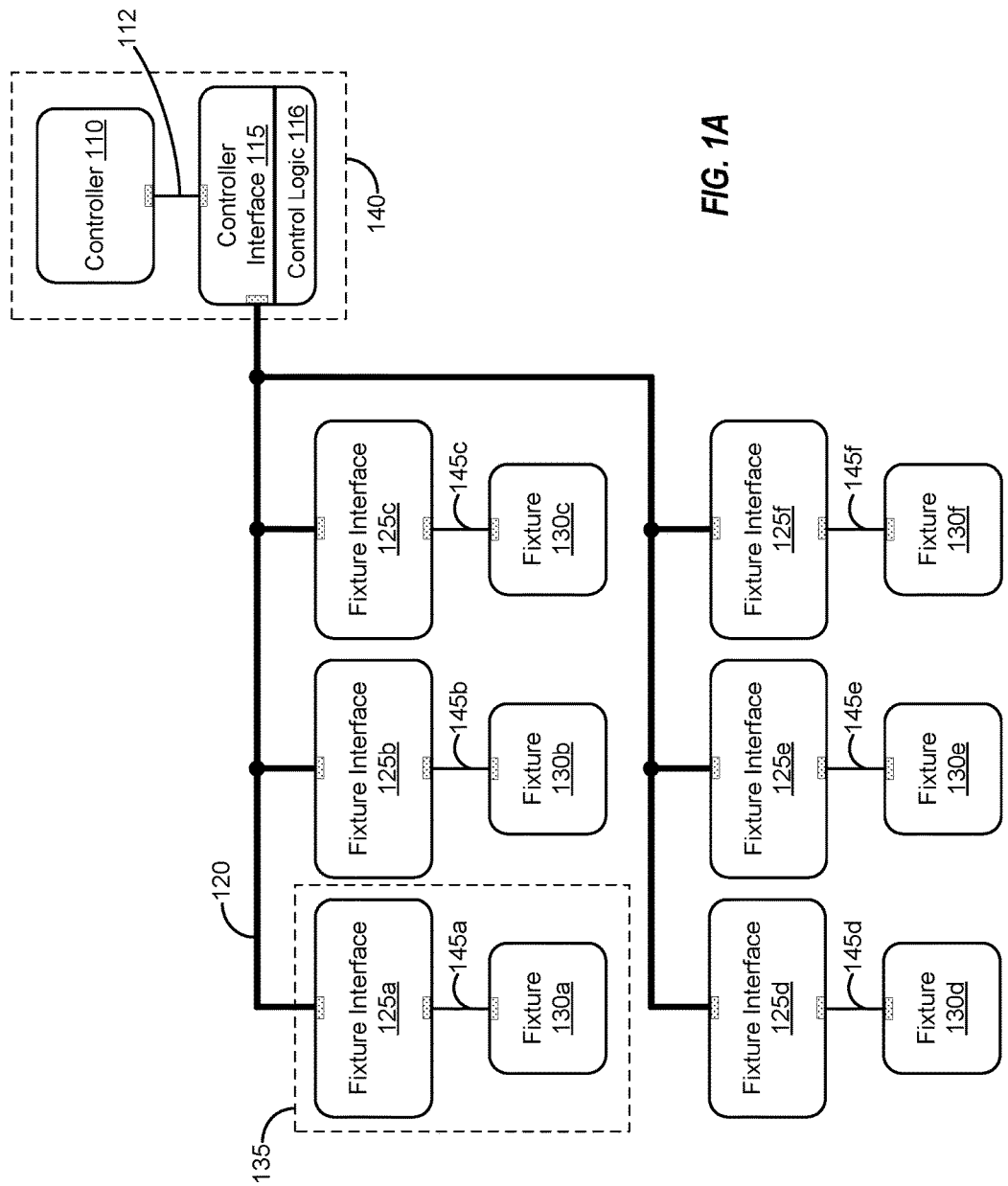
FIG. 1A is an example of a system using powerline communications (PLC) for providing data to fixtures.

FIG. 1A is an example of a system using powerline communications (PLC) for providing data to fixtures. The system of FIG. 1A can be used to provide an easier-to-setup event, for example, by reducing the number of cables.

In FIG. 1A, fixtures 130a-f may be fixtures, or devices, used in a production of an event. For example, devices 130a-c may be lights on a truss above a stage on which performers play at the event. Device 130d may be a fog machine, device 130e may be a laser, and device 130f may be another light set up elsewhere for the event.

In FIG. 1A, fixtures 130a-f receive control data (e.g., data indicating operating parameters determining how fixtures 130a-f should operate or perform) generated by controller 110 (e.g., a physical control console for coordinating the fixtures used in the event or a virtual control console implemented on a computer, tablet, smartphone, etc.). Controller 110 may generate the control data to follow a particular lighting and effects protocol (e.g., DMX, Art-Net, ACN, etc.). Fixtures 130a-f may use the same or other lighting and effects protocol than the one used by controller 110.

For example, controller 110 in FIG. 1A communicates with controller interface 115, having control logic 116, via controller network 112 to provide control data on powerline network 120. Fixture interfaces 125a-f receive the control data on powerline network 120 from controller interface 115 and forward the control data if it is addressed to a fixture on its corresponding fixture networks 145a-f. The fixture may then update its operating parameters based on the provided control data. For example, the control data may indicate that a fog machine (as a fixture) should turn on, rotate to a particular orientation, and provide a certain intensity of fog generation. As another example, for a light, control data may indicate light intensity, orientation, motion, color, lens position (focus), gobo (pattern) selection, shutter state, and special effects.

In a more detailed example, controller 110 may intend to provide control data for fixture 130a (e.g., a light) to increase its light intensity and change its orientation (or other operations of the light). As a result, controller 110 may generate the control data and a corresponding address for fixture 130a such that the control data is associated with fixture 130a. Controller interface 115a receives the control data on controller network 112 and translates, or maps, the address for fixture 130a on controller network 112 to an address on powerline network 120. Moreover, controller interface 115a may modify portions of the control data, for example, a channel range or operating parameter values, as discussed later herein. In some implementations, controller interface 115a may translate, or map, the addresses from an address of controller network 112 to an address corresponding to powerline network 120 because the different components of the system may have different ways of organizing the various fixtures 130a-f (e.g., grouped in different controller logical networks grouping subsets of fixtures 130a-f, such as having fixtures 130a-c in one controller logical network on controller network 112 because they are on the same truss, with the remaining fixtures 130d-f on another controller logical network on controller network 112) that may be different than how the fixtures are perceived by controller interface 115.

In the preceding example, controller interface 115 may then provide the control data and address data on powerline network 120. Powerline network 120 may be a three-phase powerline network powered by a power supply. However, in other implementations, powerline network 120 may be a single-phase or two-phase network. Accordingly, controller interface 115 provides the control data and address data on the same power conductors used to power fixtures 130a-f. As a result, dedicated control data cabling do not need to be used, reducing the overall number of cables needed to operate the fixtures for the event.

Fixture interfaces 125a-f in FIG. 1A are coupled with powerline network 120 and may detect that control data is addressed to fixture 130a-f on its corresponding fixture network 145a-f. For example, when controller interface 115 provides the control data and address data for fixture 130a on powerline network 120, fixture interface 125a may determine that the address data is addressed to fixture 130a on its fixture network 145a, and therefore, may provide the control data to fixture 130a. Fixture interface 125a may also modify the control data and translate the address in the address data from powerline network 120 to fixture network 145a.

Controller interface 115 may store data used to perform translation of addresses indicated in the address data between controller network 112 and powerline network 120. Fixture interfaces 125a-f also may store data used to perform translation between powerline network 120 and fixture networks 125a-f. FIG. 1B is an example of data used to perform address mapping that may be stored among the various components of the system, including controller interface 115 and fixture interfaces 125a-f. In FIG. 1B, the "Plan ID" (or PLID) column may be a programmer-provided name for each of the fixtures. For example, T1.1, T1.2, and T1.3 may be names for how a programmer identifies fixtures 130a-c, respectively (e.g., by identifying each is on the same truss labeled "T1"). T2.1, T2.2, and T2.3 may be names for how the programmer identifies fixtures 130d-f, respectively (e.g., grouping the fixtures on another truss).

The "Fixture Network" columns include a logical network and an address. In FIG. 1A, each fixture interface 125a-f provides a single logical network on its fixture network 145a-f and only has a single address because a single fixture is attached to its corresponding fixture network. If multiple fixtures are attached to a single fixture interface, then multiple addresses may exist. In other implementations, fixture interfaces may include multiple logical networks.

The "Powerline Network" columns in FIG. 1B also include a logical network and addresses for powerline network 120. For example, a single logical network may be used, but six unique addresses are used because each fixture 130a-f may be uniquely identified on powerline network 120. The "Controller Network" columns also include a logical network and address for controller network 112. The controller network column includes two logical networks for the separate trusses (i.e., T1.1, T1.2, and T1.3 may be assigned the same logical network since they are on the same truss, and T2.1, T2.2, and T2.3 may be assigned another logical network since they are on a different truss). Since each truss is viewed as a separate logical network on controller network 112, each may include addresses 1-3 for the three fixtures on the logical network.

The above data may be used to translate, or map, addresses from how the programmer or controller observes the setup of the fixtures to how the fixtures are observed by the components of the system (e.g., fixtures 130a-f, fixture interfaces 125a-f, and controller interface 115). For example, controller 110 may provide control data with a controller network address corresponding to the first logical network and address "1" to indicate fixture 130a. Controller interface 115 may translate that to the first logical network and address "1" on powerline network 120. Fixture interface 125a may determine that corresponds to fixture 130a, and therefore, translates it to the first logical network on fixture network 145a and addressed to fixture 130a. Accordingly, data may be sent among the different networks and addresses among those networks by translating addresses between them and providing the data with those translated addresses.

As another example, controller 110 may provide control data for T2.1 (e.g., fixture 130d) on controller network 112 with a logical network "2" and address "1." Controller interface 115 may translate that to logical network "1" and address "4" on powerline network 120. That may be received by fixture interface 125d and provided to fixture 130d on logical network "1" and address "1" on fixture network 145d.

In some implementations, controller network 112, powerline network 120, and fixture networks 145a-f may use different protocols and may translate between different protocols when forwarding the control data and translating addresses. For example, controller 110 may provide data on controller network 112 with the Art-Net protocol, controller interface 115 may provide data on powerline network 120 with the DMX protocol, fixture interface 125a may provide data on fixture network 145a with the DMX protocol, and fixture interface 125b may provide data on fixture network 145b with the ACN protocol. As a result, the various interfaces may convert data from one protocol to another protocol. In some implementations, different fixtures on the same fixture network may use different protocols, and therefore, a fixture interface may provide data on its fixture network using different protocols as well. Accordingly, the system may use a variety of protocols and eventually translate the control data and address data to a protocol used by the fixtures.

As another example, fixtures can operate based on control data providing operating parameters indicating how the fixtures should perform. Given an address and an operating parameter type (e.g., light intensity), an operating parameter value (e.g., 50% intensity) for the operating parameter type for the fixture can be set. Different protocols provide the values via different techniques.

The DMX protocol provides a message with the control data providing operating parameter values for all of the operating parameter types for all of the fixtures on the network. The values can correspond to particular operating parameter types and addresses based on a location within the data structure of the message. That is, a value in the message can be mapped to the operating parameter type of a specific fixture at an address. For example, a message in the DMX protocol can have 512 channels (e.g., one-byte channels) and a location of a value within the DMX message corresponds to the channel number of the value's first byte as a mapping. The message can be sent to all of the fixtures on the network. As a result, a fixture interface may be familiar with the mapping to be able to provide the value to be applied to a specific fixture's operating parameter type.

By contrast, Architecture for Control Networks (ACN) can provide a message for all or a subset of the available fixtures (e.g., a single fixture, three out of five fixtures, etc.) and include all or a subset of the available values for operating parameter types. The address and operating parameter type can be explicitly defined in the message along with the value. As a result, a fixture interface can decode (determine the content of) the message without needing any sort of mapping as previously described with the DMX protocol messages. Additionally, the ACN protocol messages can be provided on a time-triggered (e.g., at threshold time intervals, such as 1/30 second) or an event-triggered (e.g., when a change in a value of an operating parameter type is determined to have occurred) basis.

Conversion may also occur between time-triggered and event-triggered messages and/or protocols. For example, regarding converting from a time-triggered protocol to an event-triggered protocol, when a value changes from a first time-based message to a second time-based message, the latest values can then be transmitted using the event-triggered protocol. As a result, an interface as described herein can store values of the operating parameter types and determine that a value indicated in a received message is different than what was previously received (and provided to a fixture) from a prior message, and therefore, an event-triggered message providing the new value can be generated and provided on the corresponding network. Regarding converting from an event-triggered protocol to a time-based protocol, the values can be stored by an interface and updated when a message is received and it is determined to have new values. The current values as stored by the interface can be used to generate time-triggered messages, for example, at threshold time intervals.

Converting from a protocol using a channelized message format (e.g., DMX) to a protocol that encodes (provides) addresses and operating parameter types in the message format (e.g., ACN) can also be performed by using a mapping of address and operating parameter type to channel as a location.

The example of FIG. 1A shows a single controller 110. However, in other implementations, multiple controllers 110 may communicate with a single controller interface 115 to provide data on powerline network 120. Moreover, multiple controller interfaces 115 may be coupled with and be providing data on powerline network 120.

Figure 2A:
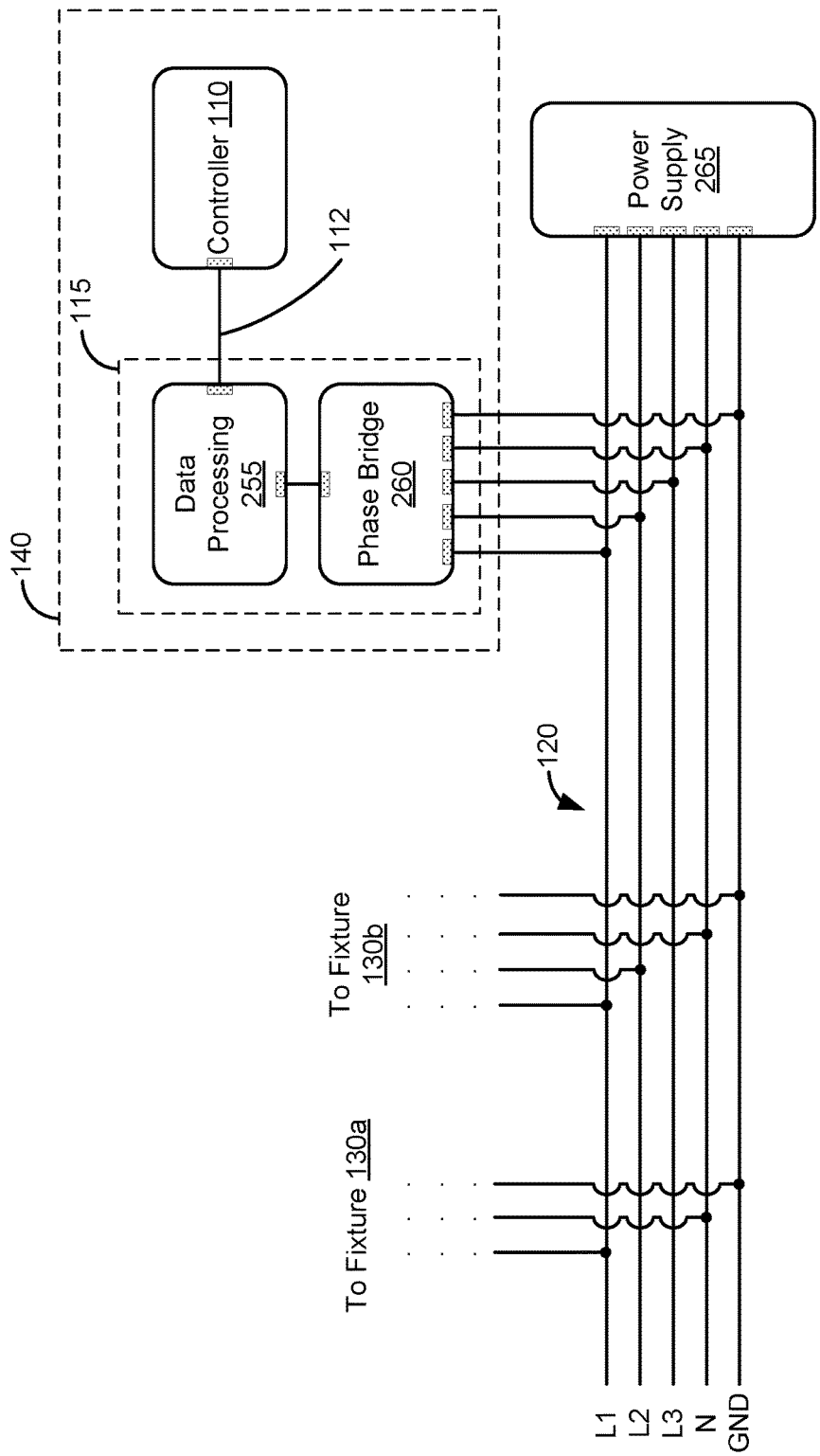
FIG. 2A is an example of a controller interface environment.

The control data and address data may be provided on powerline network 120 through a variety of techniques. FIG. 2A is an example of a controller interface environment. In FIG. 2A, controller interface environment 140 includes controller interface 115 and controller 110 communicating with controller network 120, as in FIG. 1A. As previously discussed, controller interface 115 allows for controller 110 to be able to provide data to powerline network 120, and eventually to a fixture. In particular, controller interface 115 includes circuitry for mapping address data between controller network 112 and powerline network 120 and providing control data on powerline network 120 with the appropriate address, as previously discussed. For example, data processing unit 255 of controller interface 115 may include data from the table of FIG. 1B to translate address data between controller network 112 and powerline network 120, as well as functionality for converting between different protocols (e.g., if controller network 112 uses Art-Net and powerline network 120 uses ACN), and modifying the data. Phase bridge 260 may "write" the translated, converted, and/or modified data to powerline network 120.

The data may be provided on powerline network 120 by providing the data on one or more conductors L1, L2, L3, N (i.e., neutral), and GND (i.e., ground) of powerline network 120. Conductors L1, L2, and L3 may each provide an alternating current of the same frequency, but at 120 degree phase shifts. For example, conductor L1 may be at a 0 degree phase shift, conductor L2 may be at a 120 degree phase shift, and conductor L3 may be at a 240 degree phase shift. Accordingly, the voltage on a sinusoidal AC signal for each of conductors L1, L2, and L3 may reach a "peak" one-third of a period following one of the other two conductors and one-third of the period before the remaining conductor. As an example, the sinusoidal AC signal on conductor L2 may reach its peak one-third of the period following the sinusoidal AC signal reaching its peak on conductor L1 and one-third of the period before the sinusoidal AC signal reaching its peak on conductor L3.

Each of the conductors of powerline network 120 may be provided the same data. For example, data being provided to fixture 130a may be provided on the L1, L2, L3, N, and GND conductors of power line network 120 provided by power supply 265. In another implementation, subsets of the conductors of powerline network 120 may be provided different data. One subset of the conductors can be used to provide data to fixtures 130a-c and another subset of the conductors can be used to provide data to fixtures 130d-f. For example, since fixture 130a in FIG. 2A is only coupled with L1, N, and GND, the data for fixture 130a may only be provided on those conductors and not L2 and L3.

Accordingly, in FIG. 2A, phase bridge 260 of controller interface 115 may provide data to fixtures 130a and 130b in FIG. 1A by putting it on the conductors of powerline network 120. In FIG. 2A, fixture 130a uses L1, N, and GND as power supplies, and therefore, is provided the corresponding conductors. Fixture 130b uses L1, L2, N, and GND as power supplies and is provided the corresponding conductors as well.

Phase bridge 260 may be a polyphase bridge capable of writing the data to each of the conductors of powerline network 120. However, in other implementations, phase bridge 260 may include multiple single-phase bridges writing data independently to the conductors (e.g., for the different phases L1, L2, and L3, as well as N and GND). Controller 110 and controller interface 115 may be integrated together in a single enclosure or may be in separate enclosures.

Figure 2B:
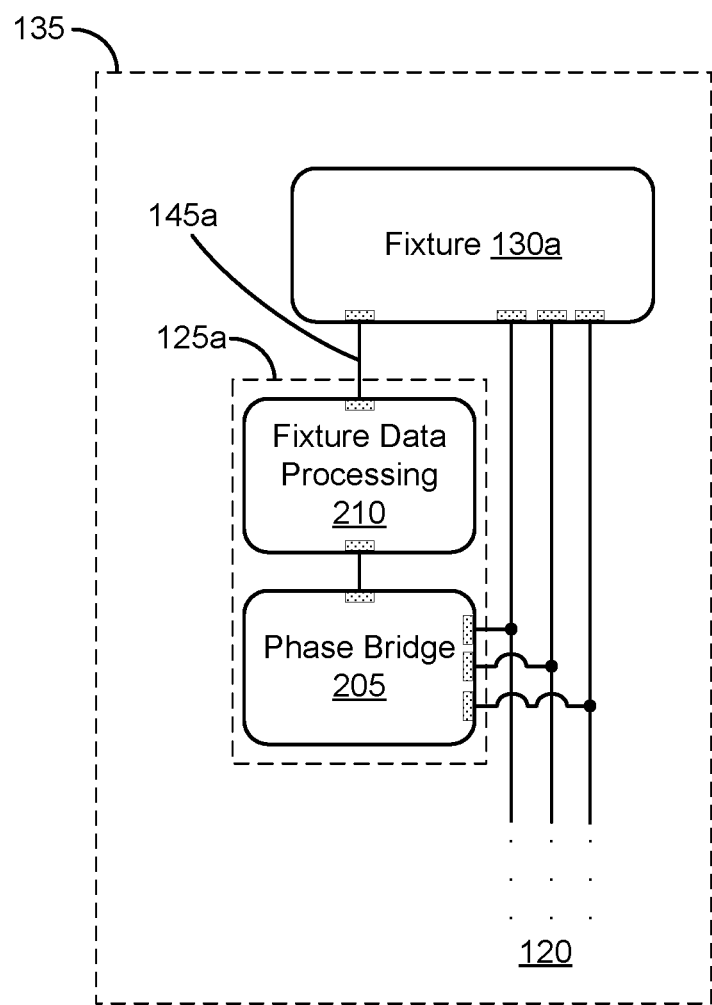
FIG. 2B is an example of a fixture interface environment.

FIG. 2B is an example of a fixture interface environment. In FIG. 2B, powerline network 120 is used to power fixture 130a, as well as provide data on fixture network 145a. In FIG. 2B, fixture interface 125a includes phase bridge 205 coupled with the conductors of powerline network 120 that are used by fixture 130a. Fixture data processing 210 may receive the data (i.e., control data and address data) on powerline network 120 from phase bridge 205 and perform the translating, converting, and/or modifying of data from powerline network 120 to be provided on fixture network 145a. For example, fixture data processing 210 may include data from the table of FIG. 1B to translate address data between powerline network 120 and fixture network 145a, as well as functionality for converting between different protocols. Accordingly, phase bridge 205 may extract data from power line network 120, provide it to fixture data processing 210, fixture data processing 210 can determine the data is for fixture 130a, and then provide the data to fixture 130a so that it can update its operating parameters.

In some implementations, multiple powerline networks may be used in an event. That is, different power generation units (e.g., multiple power supplies 265 in FIG. 2A) may be used to power different groupings of fixtures. Moreover, a single power generation unit can be associated with multiple powerline networks. For example, different powerline networks powered by the same power generation unit may not be able to observe each other due to the cabling distance between them or due to filtering components among or within the networks that can filter out signals such that data from one network is not provided to another network. Additionally, in some implementations, two powerline networks can concurrently operate on the same cables if they are logically isolated from each other. However, this may result in the data capacity of the powerline networks reducing due to having to share the available bandwidth of the shared cables.

Figure 3:
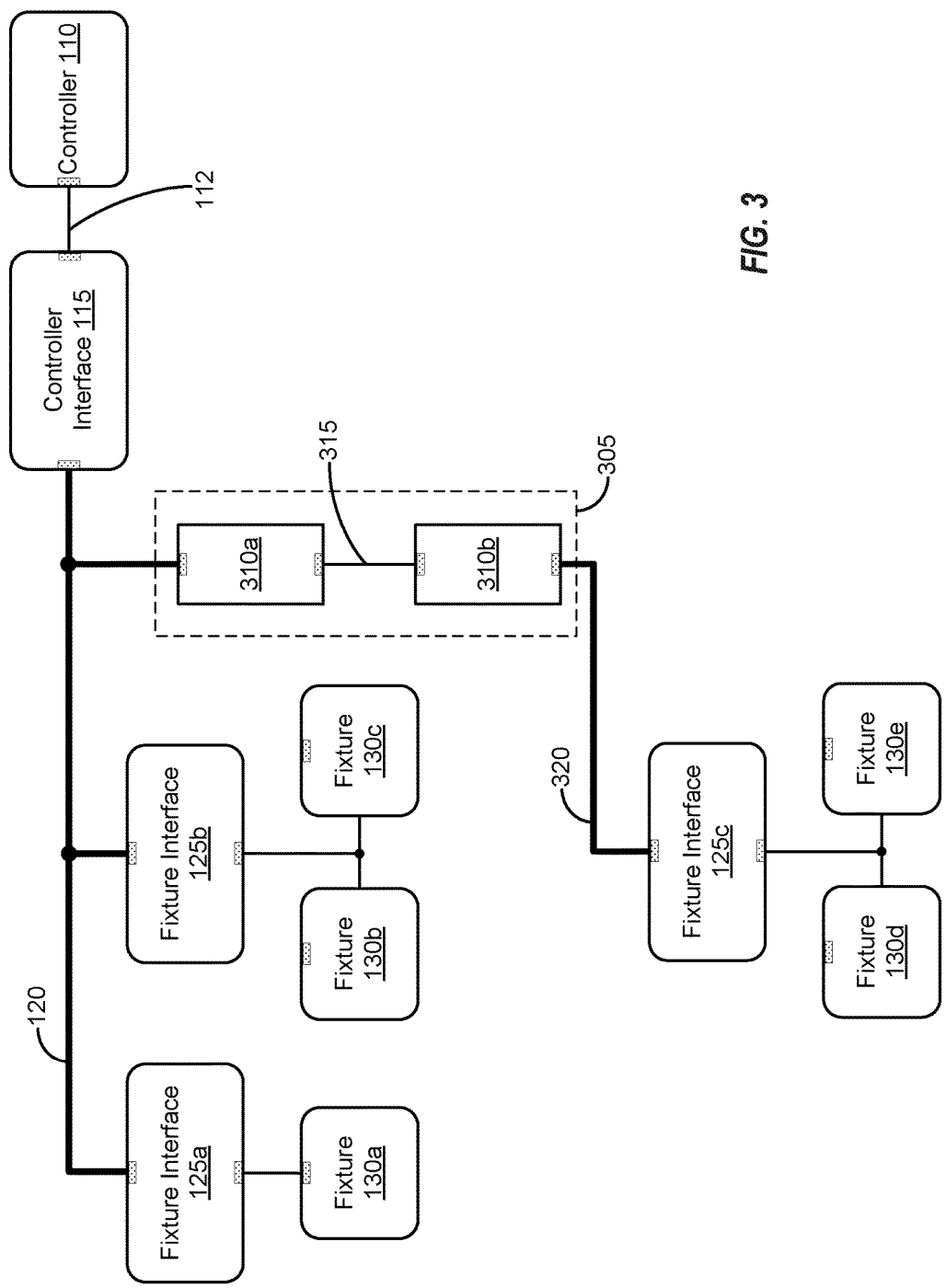
FIG. 3 is an example of bridge interfaces used to communicate between different powerline networks.

FIG. 3 is an example of bridge interfaces used to communicate between different powerline networks. In FIG. 3, bridge network environment 305 includes upstream bridge interface 310a and downstream bridge interface 310b for providing data between powerline network 120 and powerline network 320. Upstream bridge interface 310a may determine whether address data (and the corresponding control data) on power line network 120 is for a fixture coupled with a fixture interface on powerline network 320 (e.g., fixtures 130d and 130e on the fixture network of fixture interface 125c), and if so, forward the address data and control data to downstream bridge interface 310b to put on powerline network 320. Accordingly, a subset of the control data on powerline network 120 may be identified as needing to be put on power line network 320 by upstream bridge interface 310a. Bridge network 315 may be a power cable (e.g., similar to powerline network 120 or powerline network 320), or be another type of cable, such as an Ethernet cable that can be used to provide data between powerline networks 120 and 320.

Figure 4:
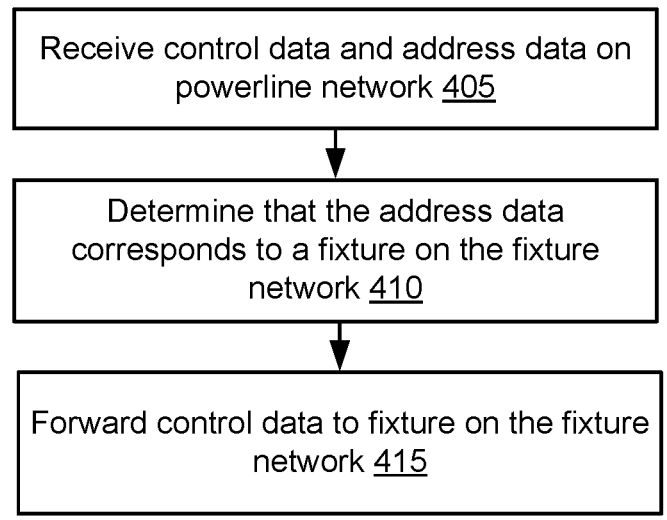
FIG. 4 shows a flowchart of an example process flow for a fixture interface forwarding data to a fixture.

FIG. 4 shows a flowchart of an example process flow for a fixture interface forwarding data to a fixture. In FIG. 4, at block 405, a fixture interface on a powerline network can receive control data and address data. For example, fixture interface 125a in FIG. 3 can receive data on powerline network 120. At block 410, the fixture interface can determine that the address data corresponds to a fixture on its fixture network. For example, fixture interface 125a in FIG. 3 can determine that an address on powerline network 120 corresponds to fixture 130a on the fixture network of fixture interface 125a. At block 415, the fixture interface can forward the control data to the fixture on the fixture network. For example, fixture interface 125a can translate the address from the address data on powerline network 120 to an address on the fixture network between fixture interface 125a and fixture 130a and provide the control data on the new address to the fixture network such that fixture 130a can receive the control data, and therefore, update the settings for its operating parameters.

Figure 5:
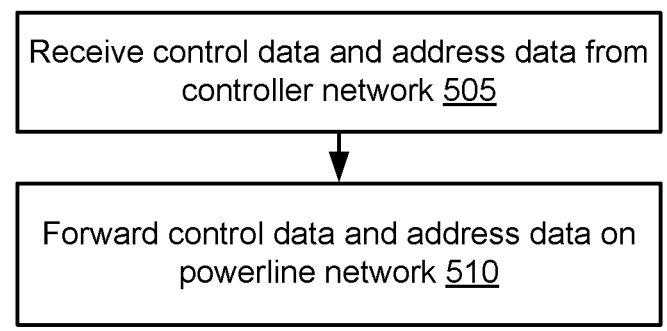
FIG. 5 shows a flowchart of an example process flow for a controller interface forwarding data to a fixture.

FIG. 5 shows a flowchart of an example process flow for a controller interface forwarding data to a fixture. In FIG. 5, at block 505, a controller interface may receive data from a controller network. For example, in FIG. 3, controller 110 can provide control data and address data on controller network 112 to controller interface 115. The address data may indicate a particular fixture that the control data is addressed to. At block 510, the controller interface may forward the control data and address data to the fixture by putting it on a powerline network. For example, in FIG. 3, controller interface 115 may translate the address data from an address on controller network 112 to an address on powerline network 120 and then provide the control data on the translated address data on powerline network 120.

Figure 6A:
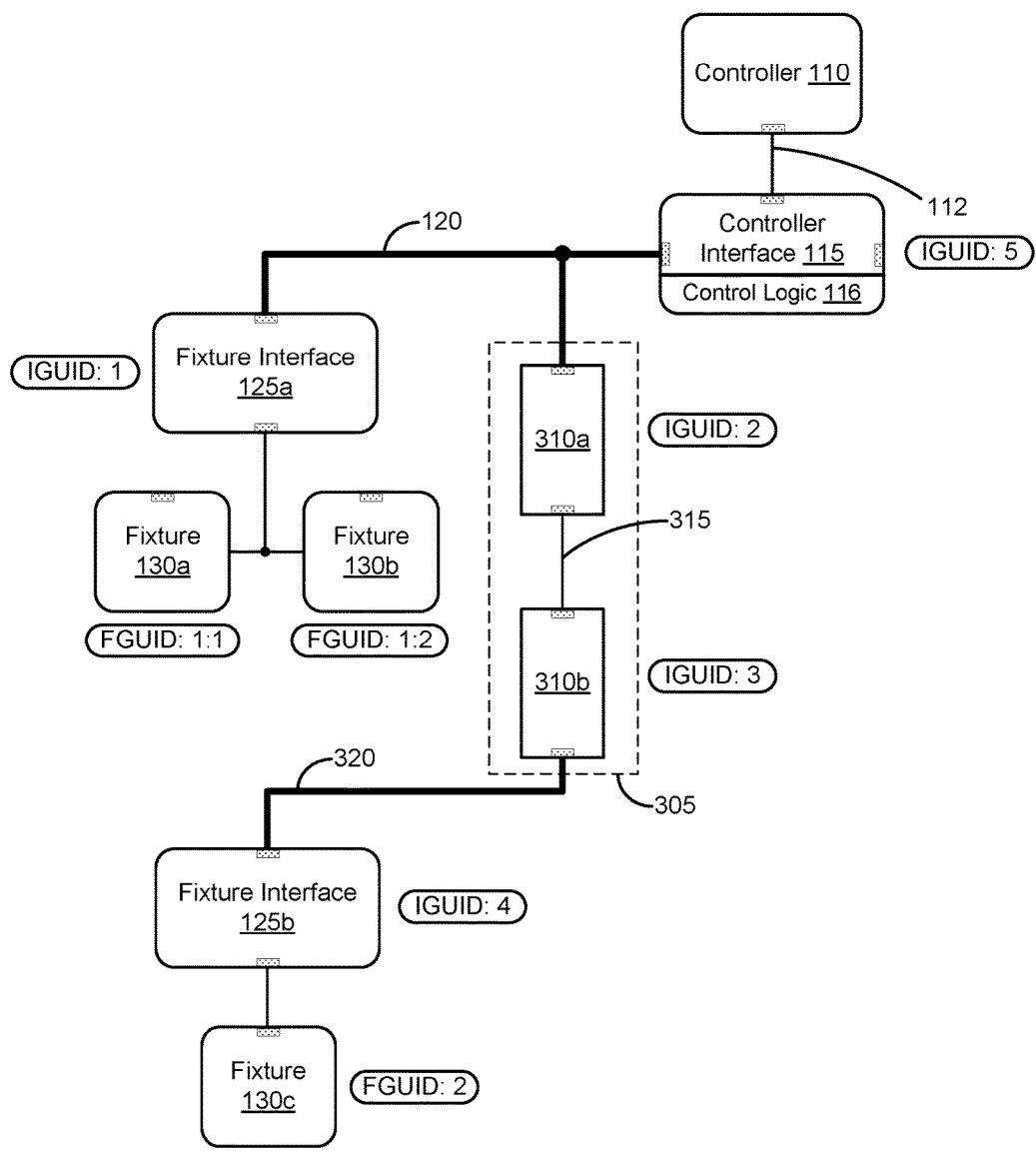
FIG. 6A is an example of commissioning addresses and protocols for the components of the system.

In some implementations, the various components on the fixture networks, powerline networks, and controller networks may be "commissioned" through a variety of mechanisms to implement a plan for the event. In particular, protocols and addresses may be assigned to the fixtures, fixture interfaces, bridge interfaces, controller interfaces, and controller on the controller network, bridge networks, powerline networks, and fixture networks during commissioning to allow for the previously discussed functionality. FIG. 6A is an example of commissioning addresses and protocols for the components of the system. FIG. 6B is an example of tables representing data used by components of the system of FIG. 6A to translate addresses between the different networks. That is, the data in FIG. 6B may be generated during the commissioning process of FIG. 6A.

In FIG. 6A, each fixture and interface may be provided a globally unique identifier, for example, based on a unique identification, serial number, or other identifier generated by the manufacturer of the fixture or interface. The unique identifier may be used to program the controller, fixture interfaces, controller interfaces, and bridge interfaces to generate the proper addresses for the networks, as well as facilitate the forwarding of control data and translation of address data from network-to-network Accordingly, each fixture may be provided a fixture globally unique identifier (FGUID) and each interface (i.e., fixture interfaces, bridge interfaces, and controller interfaces) may be provided an interface globally unique identifier (IGUID). In some implementations, the FGUIDs may be generated based on IGUIDs. For example, additional information (e.g., a simple counter incremented for each fixture attached to the fixture interface, serial number information of the fixtures, etc.) may be concatenated to the IGUID of fixture interfaces to generate the FGUIDs for the fixtures.

In FIG. 6A, fixture interface 125a has an IGUID of 1, and therefore, fixtures 120a and 120b have FGUIDs of 1:1 and 1:2, respectively, which are based on fixture interface 125a having an IGUID of 1 and incrementing a counter as each fixture is provided an FGUID resulting in the FGUIDs of 1:1 and 1:2. Fixture 130c has an FGUID of 2. Additionally, fixture interface 125a has an IGUID of 1, bridge interface 310a has an IGUID of 2, bridge interface 310b has an IGUID of 3, fixture interface 125b has an IGUID of 4, and controller interface 115 has an IGUID of 5.

The data in the tables in FIG. 6B may be generated during the commissioning process. In general, a mapping from each FGUID to a PLID (i.e., the plan identifier provided by the programmer to provide a meaningful name to a fixture so that it can be easily identified and selected by the programmer using controller 110), between FGUIDs and IGUIDs of bridge interfaces (i.e., for fixtures on a different powerline network than controller interface 115), between FGUIDs and fixture network addresses, FGUIDs and powerline network addresses, and FGUIDs and controller network addresses may be performed, in any order, and in any combination of manual, automatic, or hybrid (i.e., partly manual and partly automatic) methods to provide the proper addresses. Additionally, the protocols to use on the fixture, bridge, and controller networks may also be specified, also in any combination of manual, automatic, or hybrid methods.

For example, table 605 indicates an association between each FGUID and a PLID. The data in table 605 may be provided by loading a configuration file that specifies the particular mapping of FGUIDs to PLIDs, automatically generating PLIDs for FGUIDs (e.g., Fixture 1 to Fixture n, where n is the number of fixtures), or manually. The data in table 605 may be stored in controller 110 or controller interface 115.

As a result, when the programmer is operating controller 110 in FIG. 6A, the PLID of the fixture may be selected, operating parameters adjusted or set, and then transmitted on controller network 112 to controller interface 115, having control logic 116. Thus, the programmer can operate the fixtures using a programmer-supplied name for the fixtures, which would be easier to use and remember, but the data in table 605 would be able to translate the PLID to a specific fixture FGUID.

The FGUIDs for fixtures that need to communicate through bridge interfaces 310a and 310b (i.e., fixture 130c with the FGUID of 2) can be mapped to the IGUIDs of the bridge interfaces. For example, table 625 indicates that FGUID 2 (i.e., fixture 130c) is reachable from controller interface 115 through an upstream and downstream pair of bridge interfaces 310a and 310b. In some implementations, the bridge interfaces may be able to discover all of the fixtures on the downstream powerline network (i.e., powerline 320 in FIG. 6A) and provide the FGUIDs for the fixtures to controller interface 115 to program into table 625 (i.e., table 625 may be stored in controller interface 115). In another implementation, controller interface 115 may receive the FGUIDs and program table 625 in bridge interfaces 310a and/or 310b so that they may recognize the subset of data on powerline network 120 to forward onto powerline network 320.

FGUIDs may be mapped to a fixture network address, as indicated in table 620 in FIG. 6B. A fixture interface may be able to discover the fixtures attached to its fixture network and generate FGUIDs for each of the fixtures. As previously discussed, this may be based on the IGUID of the fixture. Additionally, the generated FGUIDs may be associated with a fixture network address. The data in table 620 may be stored in the fixture interface or controller interface.

Table 615 shows the powerline network addresses for each FGUID. Generally, all FGUIDs on a powerline network can be discoverable by controller interface 115, and therefore, the addresses may be assigned automatically. For example, each fixture interface may provide a list of the FGUIDs on its fixture network to a controller interface to store table 615. In some implementations, table 615 may be stored in a fixture interface.

Table 610 includes data showing a controller network address for each FGUID. Given the controller interfaces used, the set of FGUIDs discovered by the controller interfaces, and the PLIDs in table 605, controller logical networks and device addresses on those networks may be automatically computed.

In some implementations, a controller interface may receive the FGUIDs for each of the fixtures from the various fixture interfaces and bridge interfaces. The controller interface may then establish a powerline network address for each of the FGUIDs and correlate that with a corresponding controller network address used on the controller network. The controller interface may also provide a powerline network address for each fixture on a powerline network that is reached through bridge interfaces, too. Accordingly, the controller interface may be able to discover all of the fixture interfaces, bridge interfaces, and fixtures attached in the fixture networks, bridge networks, and powerline networks. In some implementations, the controller interface may be able to provide data on the various networks to program the interfaces with the appropriate data (e.g., the data in the tables of FIG. 6B). For example, the controller interface may be able to program bridge interfaces so that the control data on particular addresses of the powerline network may be forwarded to another powerline network.

Figure 7:
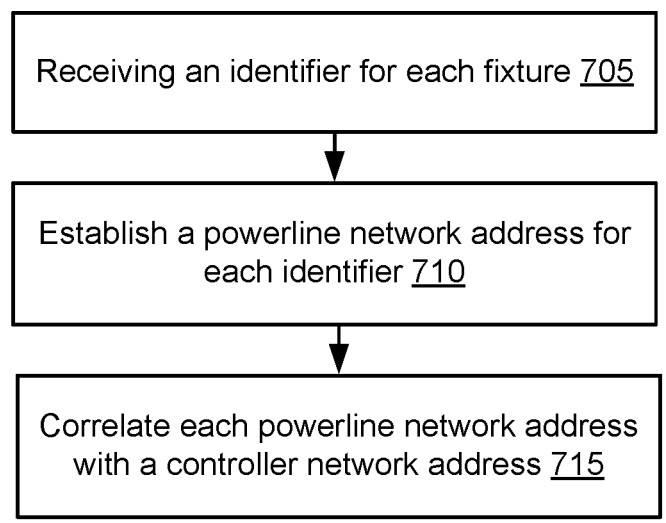
FIG. 7 shows a flowchart of an example process flow for commissioning by a controller interface.

FIG. 7 shows a flowchart of an example process flow for commissioning by a controller interface. In FIG. 7, at block 705, an identifier for each fixture may be received. For example, an FGUID for each fixture may be received. At block 710, a powerline network address for each FGUID may be generated. For example, controller interface 110 may generate a powerline network address for each FGUID. At block 715, each powerline network address may be correlated with a controller network address.

In some implementations, the control data may also be modified. For example, controller 110 in FIG. 6A may use the Art-Net protocol and all of the fixtures may use the DMX protocol, which both provide the control data in terms of DMX channels. DMX channels may carry settings for the operating parameters of the fixtures. Powerline network 120 and powerline network 320 may also provide the control data in terms of DMX channels.

Figure 8:
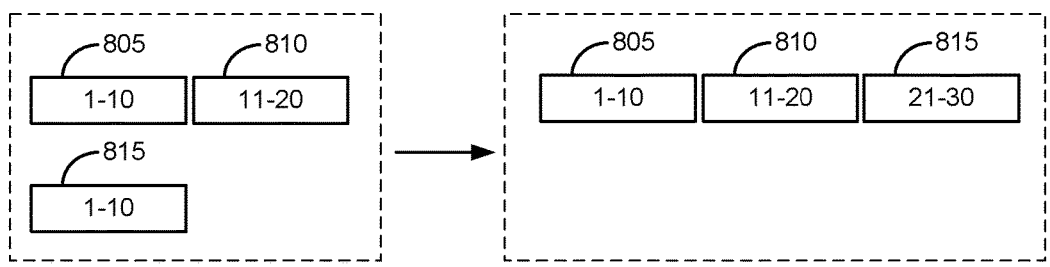
FIG. 8 is an example of modifying control data.

Each of fixtures 130a-c in FIG. 6A may use 10 DMX channels for the control data to update their operating parameters. However, controller 110 may transmit all of the control data for fixtures 130a-c on two logical networks (e.g., one logical network for fixtures 130a and 130b, and another logical network for fixture 130c) on controller network 112. Transmitting data for separate networks may create different sets of frames for the control data, one frame for each network. For example, in FIG. 8, controller control data transmission includes two frames: one frame including control data 805 having channels 1-10 for fixture 130a and control data 810 having channels 11-20 for fixture 130b; and a second frame including control data 815 having channels 1-10 for fixture 130c.

To minimize overhead on powerline network 120, controller interface 115 may consolidate the two frames it receives into a single frame by modifying, or organizing, the channel data for the two frames. In particular, since control data 805 and 815 are both associated with channels 1-10, one may be modified to have a different channel range. For example, in FIG. 8, control data 815 may be modified to channels 21-30 such that it may be included in the same frame as control data 805 and 810. As a result, data from two different controller logical networks may be put on powerline network 120 together in the same frame by modifying the channels used by a subset of the control data being provided to the fixtures.

The channel ranges of the control data may be modified each time a subset of the data is forwarded. For example, when control data 815 is received by bridge interface 310a and provided on powerline network 320, it may be modified again to have a channel range of 1-10 when provided on powerline network 320 by bridge interface 310b. Likewise, fixture interfaces may also modify the channel ranges of control data when it is forwarded to the corresponding fixture network. In some implementations, the channel range may be mapped to a different channel range by the fixture interfaces. For example, rather than mapping control data 815 from 1-10 to 21-30 and then back to 1-10, it might be modified to a new channel range. For example, it can be modified to 11-20 or 31-40.

In some implementations, multiple controller logical networks may be set up by the programmer. The channel ranges might not overlap as in the prior example within the controller logical networks. However, the data may be modified to map onto a single powerline logical network by adjusting the channel ranges such that no gaps are used in the addressing.

Any data generated by downstream components can also be provided to upstream components. For example, fixtures can provide data to fixture interfaces, and fixture interfaces can provide data to controller interfaces. As a result, management traffic may be provided all the way up to a controller from fixtures. Additionally, depending on the protocols used by the different components, network messages such as acknowledgement packets can also be provided upstream. The data provided upstream can also be provided in frames and modified or mapped to different channel ranges as they are provided from one component to another component.

In some implementations, controller interfaces, fixture interfaces, and bridge interfaces may change the values of the control data such that the operating parameters of the fixtures would be different than intended by the controller. For example, a light may have a minimum on time that should be observed. If the controller provides control data indicating that the light should turn off, but the controller interface determines that the minimum on time has not been met, then the control data provided by the controller may be overwritten by the controller interface such that the light remains on. Accordingly, the various interfaces may be able to edit the values of the operating parameters provided in the control data. In some implementations, the interfaces may be able to limit the rate of change of values or limit the range of values of the operating parameters. In some implementations, the controller interface may have a secondary input that may indicate an alarm or emergency, and therefore, when asserted, the data provided by the controller may be ignored and new settings may be generated for the operating parameters of the fixtures in response to the alarm input (e.g., all lights should turn on). In another scenario, a debugging environment may include one fixture needing to be under control of a maintenance technician using a debug tool while all other fixtures may operate according to the controller. Accordingly, the data for the one fixture under the control of the maintenance technician may ignore any data received from one of the interfaces.

What is claimed is:

1. A controller interface for providing control data from a controller network to a first powerline network, and ultimately, via the first powerline network, to a first fixture to which the control data is addressed, the controller interface comprising:
   (a) a first interface for connecting the controller interface to the controller network;
   (b) a second interface for connecting the controller interface to the first powerline network, wherein the first powerline network is configured to provide the control data over one or more conductor lines of the first powerline network;
   (c) a control logic device comprising programming for
      (i) receiving, from the controller network,
         first control data addressed to the first fixture on the first powerline network, and
         a first address of the first fixture based on the controller network; and
      (ii) forwarding the first control data addressed to the first fixture to the first powerline network, wherein the forwarding comprises mapping the first address from the controller network to a second address of the first fixture based on the first powerline network.

2. The controller interface of claim 1, wherein the programming for receiving is further for receiving second control data and the second address from the controller network and addressed to a second fixture on a second powerline network.

3. The controller interface of claim 2, wherein the programming for forwarding is further for organizing the first control data and the second control data to be provided on the first powerline network.

4. The controller interface of claim 3, wherein the first control data corresponds to a first channel data range, the second control data corresponds to the first channel data range, and the programming is further for forwarding the second control data by modifying the first channel data range corresponding to the second control data to a second channel data range, the first data channel range and the second data channel range being different.

5. The controller interface of claim 4, further comprising:
   a powerline bridge interface for extracting the second control data on the first powerline network and providing the second control data on the second powerline network.

6. The controller interface of claim 5, wherein the powerline bridge interface for extracting is further for modifying the second channel data range to the first channel data range.

7. The controller interface of claim 1, wherein the first powerline network is a three-phase power network.

8. The controller interface of claim 1, wherein the programming is further for providing the first control data on two or more conductor lines of the first powerline network.

9. A method for providing control data from a controller network to a first powerline network, and ultimately, via the first powerline network, to a first fixture to which the control data is addressed, the method comprising:
   receiving, by a controller interface,
      first control data addressed to the first fixture on the first powerline network, and
      a first address of the first fixture based on the controller network; and
   forwarding, by the controller interface, the first control data addressed to the first fixture to the first powerline network, wherein the forwarding comprises mapping the first address from the controller network to a second address of the first fixture based on the first powerline network.

10. The method of claim 9, the method further comprising:
    receiving second control data and the second address from the controller network and addressed to a second fixture on a second powerline network.

11. The method of claim 10, the method further comprising:
    organizing the first control data and the second control data to be provided on the first powerline network.

12. The method of claim 11, wherein the first control data corresponds to a first channel data range, the second control data corresponds to the first channel data range, and the method comprises forwarding the second control data by modifying the first channel data range corresponding to the second control data to a second channel data range, the first data channel range and the second data channel range being different.

13. The method of claim 12, further comprising:
    extracting, by a powerline bridge interface, the second control data on the first powerline network and providing the second control data on the second powerline network.

14. The method of claim 13, the method further comprising:
   modifying the second channel data range to the first channel data range.

15. The method of claim 9, wherein the first powerline network is a three-phase power network.

16. The method of claim 9, the method further comprising:
   providing the first control data on two or more conductor lines of the first powerline network.

\* \* \* \* \*